United States Patent
Yu

(10) Patent No.: US 6,684,557 B1
(45) Date of Patent: Feb. 3, 2004

(54) PROCESS FOR MAKING AN AQUATIC LURE PHOSPHORESCENT AND CHARGING SAME WITH AN ULTRAVIOLET LIGHT

(76) Inventor: Sun Yu, 2850 Coolidge Hwy., Berkley, MI (US) 48072

( * ) Notice: Subject to any disclaimer, the term of this patent is extended or adjusted under 35 U.S.C. 154(b) by 0 days.

(21) Appl. No.: 10/237,639

(22) Filed: Sep. 9, 2002

(51) Int. Cl.$^7$ ............................................. A01K 85/01
(52) U.S. Cl. ................... 43/17.6; 250/459.1; 250/461.1
(58) Field of Search ................ 43/17.6, 17.5, 43/42.32, 42.33; 250/458.1, 459.1, 461.1, 462.1

(56) References Cited

U.S. PATENT DOCUMENTS

| | | | |
|---|---|---|---|
| 564,839 A | * 7/1896 | Pflueger | 43/17.6 |
| 1,407,534 A | * 2/1922 | Hering | 427/554 |
| 1,637,963 A | * 8/1927 | Sauvgé | 427/157 |
| 1,817,694 A | * 8/1931 | Lafky | 43/17.6 |
| 1,900,339 A | * 3/1933 | Harrell | 43/17.6 |
| 2,303,097 A | * 11/1942 | Townsend et al. | 43/17.6 |
| 2,372,071 A | * 3/1945 | Fernberger | 252/301.4 R |
| 2,558,870 A | * 7/1951 | Michelman | 362/158 |
| 2,563,522 A | * 8/1951 | Fisher | 43/17.5 |
| 2,568,279 A | * 9/1951 | Franz et al. | 250/459.1 |
| 2,979,467 A | * 4/1961 | Keller | 252/301.4 S |
| 3,568,354 A | * 3/1971 | Yacko | 43/17.6 |
| 3,708,903 A | * 1/1973 | Bercz et al. | 43/17.6 |
| 3,834,058 A | * 9/1974 | Gaunt | 43/42.32 |
| 3,870,843 A | * 3/1975 | Witte | 362/189 |
| 3,918,190 A | * 11/1975 | Hornbeck | 43/17.6 |
| 3,935,659 A | * 2/1976 | McCallum | 43/17.6 |
| 4,194,936 A | * 3/1980 | Martuch | 43/17.5 |
| 4,617,751 A | * 10/1986 | Johansson | 43/17.6 |
| 4,621,447 A | * 11/1986 | Rhodes | 43/17.6 |
| 4,774,643 A | * 9/1988 | McGinnis et al. | 362/189 |
| 4,782,432 A | * 11/1988 | Coffman | 362/184 |
| 4,796,167 A | * 1/1989 | Brown et al. | 362/158 |
| 4,857,228 A | * 8/1989 | Kabay et al. | 252/301.4 S |
| 5,043,096 A | * 8/1991 | Lindmayer | 252/301.4 S |
| 5,063,703 A | * 11/1991 | Riley | 43/42.06 |
| 5,077,930 A | * 1/1992 | Berry | 43/42.33 |
| 5,210,525 A | * 5/1993 | Lennon et al. | 362/116 |
| 5,222,320 A | * 6/1993 | Erickson | 43/42.32 |
| 5,311,413 A | * 5/1994 | Farmer et al. | 43/17.6 |
| 5,376,303 A | * 12/1994 | Royce et al. | 252/301.4 R |
| 5,388,039 A | * 2/1995 | Dolph | 43/17.6 |
| 5,414,951 A | * 5/1995 | Martin | 43/17.5 |
| 5,424,006 A | * 6/1995 | Murayama et al. | 252/301.4 R |
| 5,472,737 A | * 12/1995 | Anders | 427/137 |
| 5,490,344 A | * 2/1996 | Bussiere | 43/17.6 |

(List continued on next page.)

FOREIGN PATENT DOCUMENTS

| | | | | |
|---|---|---|---|---|
| AU | 664687 B1 | * 11/1995 | | |
| CA | 2290903 B1 | * 5/2001 | | |
| FR | 633050 B1 | * 10/1927 | | 43/17.6 |
| GB | 1638 B1 | * 1/1885 | | 43/17.5 |
| GB | 144124 B1 | * 6/1920 | | 43/17.6 |
| GB | 1200511 B1 | * 7/1970 | | 43/17.6 |
| JP | 3-4726 B1 | * 1/1991 | | |
| JP | 5-284883 B1 | * 11/1993 | | |
| JP | 8-116845 B1 | * 5/1996 | | |
| JP | 8-126450 B1 | * 5/1996 | | |
| JP | 9-238596 B1 | * 9/1997 | | |
| JP | 10-248461 B1 | * 9/1998 | | |
| JP | 10-276618 B1 | * 10/1998 | | |
| JP | 2002-360126 B1 | * 12/2002 | | |

*Primary Examiner*—Darren W. Ark
(74) *Attorney, Agent, or Firm*—Gifford, Krass, Groh, Sprinkle, Anderson & Citkowski, P.C.

(57) ABSTRACT

A process for preparing a phosphorescent lure includes the application of phosphorescent particulate in the form of a curable paint or adhesive applié to the surface of an aquatic lure. The phosphorescent particulate is then exposed to illumination from an ultraviolet light emitting diode flashlight. A commercial package including components and instructions for the use of a phosphorescent lure is also disclosed.

23 Claims, 1 Drawing Sheet

U.S. PATENT DOCUMENTS

| | | | | |
|---|---|---|---|---|
| 5,943,809 A | * | 8/1999 | Ring | 43/17.5 |
| 5,987,802 A | * | 11/1999 | Caprio | 43/17.6 |
| 6,005,024 A | * | 12/1999 | Anders et al. | 523/172 |
| 6,018,902 A | * | 2/2000 | Gudermuth et al. | 43/42.32 |
| 6,048,280 A | * | 4/2000 | Palmer et al. | 473/416 |
| 6,095,661 A | * | 8/2000 | Lebens et al. | 362/184 |
| 6,182,391 B1 | * | 2/2001 | Hubbard | 43/42.33 |
| 6,190,018 B1 | * | 2/2001 | Parsons et al. | 362/116 |
| 6,299,323 B1 | * | 10/2001 | Yu et al. | 362/116 |

* cited by examiner

PROCESS FOR MAKING AN AQUATIC LURE PHOSPHORESCENT AND CHARGING SAME WITH AN ULTRAVIOLET LIGHT

FIELD OF THE INVENTION

The present invention relates generally to fishing tackle and in particular, to phosphorescent lures charged with ultraviolet radiation.

BACKGROUND OF THE INVENTION

It is well known that many deep-sea fish use bioluminescence to attract prey. Human anglers have recognized that under low light or poor visibility conditions, that fish and other aquatic life forms are attracted to phosphorescent lures. While scientific basis for the attraction is as yet not completely understood, the stimulation and continued emission from a phosphorescent lure are important concerns under certain fishing conditions. Phosphorescent lures are more effective than non-emissive lures under most, if not all, fishing conditions; yet, phosphorescent lures remain a small part of the total lure market. Phosphorescent lures manufactured to date have not necessarily been of the highest quality nor included desirable features such as reticulations or integral hooks.

While a phosphorescent lure is readily charged by ambient light at midday, fishing often occurs under low light conditions, under darkness, or under cloud cover. As a result, phosphorescent lures are charged by exposing the lure to visible light emissions from a flashlight or strobe light. While a flashlight is compact, it suffers from low intensity illumination leading to rapid dissipation of lure phosphorescence. Conversely, a strobe light affords high photon flux density yet is cumbersome to operate under fishing conditions. Thus, there exists a need for a system to convert a conventional lure into a phosphorescent lure. Additionally, there exists a need for a compact, high efficiency phosphor charging light source.

SUMMARY OF THE INVENTION

A process for preparing a phosphorescent lure includes the application of phosphorescent particulate to a lure. The phosphorescent particulate is in the form of a curable paint or an adhesive applié. Thereafter, the phosphorescent particulate is exposed to illumination from an ultraviolet light emitting diode flashlight. The phosphorescent emission from the phosphorescent particulate gives the lure a visible phosphorescent glow.

A lure having a phosphor thereon is activated by exposing the lure to the emission from an ultraviolet light emitting battery powered source. The source is either a light emitting diode flashlight, a mercury vapor arc tube or other gaseous vapor tube.

A commercial package includes in combination phosphorescent particulate present in a curable paint or an adhesive applié. The phosphorescent particulate in the form of a curable paint or adhesive appliqué is amenable to adherence to a surface of a lure. Also included is an ultraviolet light emitting battery powered source that includes a light emitting diode flashlight, a mercury vapor arc tube and other gaseous vapor tube. In an alternate embodiment, a commercial package substitutes a lure having a surface that is already decorated with phosphorescent particulate thereon.

DETAILED DESCRIPTION OF THE PREFERRED EMBODIMENTS

The present invention has utility as an aquatic lure. A commercial package is provided that includes a phosphorescent paint and applicator therefor or pressure adhesive applié impregnated with a phosphor, as well as an ultraviolet light emitting diode (UV LED) for stimulating the phosphorescent paint or applié. An improved process for stimulating any phosphorescent lure to emit light involves the use of a UV LED.

Phosphorescent paints, enamels and colorants are well known to the art and include, for, example, U.S. Pat. Nos. 1,407,534; 1,637,963; and 5,472,737. The choice of phosphor being dictated by the desired color of phosphorescence. Exemplary phosphor materials known to the art illustratively include group II metal-calcogenides, rare earth oxides, sulfides, phosphates, and combinations thereof doped with lanthanide series ions, such as $CaSr_2S:Bi$, $CaAl_2O_4:Eu, Nd$; and $CaSrS:Eu, Dy$. Specific compositions and colors are well known to the art as detailed, for example, in U.S. Pat. Nos. 2,372,071; 2.979,467; 5,043,096; 4,857,228; 5,424,006; and 5,376,303. Typically, a phosphor is dispersed as a particulate at from 1 to 70 total weight percent in a film forming base or impregnated into a polymeric applié. Preferably, the phosphor is dispersed from 5 to 50 weight percent. It is appreciated that multiple color phosphors are readily applied to a lure surface to yield regions of differing color emission.

The base material includes any film forming material conventional to the art, such as polyurethane, latex, acrylic and curable compositions such as epoxy, polysulfides, polythioethers, polyethers and polyisocyanates. Preferably, where the base material is curable, the base is ultraviolet light curable. A preferred paint is an acrylic. A preferred curable base is a UV curable epoxy. An exemplary two-part phosphorescent epoxy is detailed in U.S. Pat. No. 6,005,024.

A phosphorescent paint of the present invention is bottled and applied as a thin coating onto the body and/or hooks of a lure. The paint is applied by brush, spray or dip coating. Preferably, inventive phosphorescent paint is packaged within a kit in a bottle having a brush immersed therein, the brush affixed to a threaded bottle cap. Upon application of phosphorescent paint to a lure, the paint is allowed to cure in a manner particular to the base material composition. Representative cure conditions include ambient moisture, air, heat, UV light and combinations thereof. In instances where the paint is UV curable, the lure is illuminated by an ultraviolet LED flashlight. The proximity illumination of the UV curable phosphorescent paint with a UV LED is sufficient to induce cure thereof within a matter of a few minutes.

Figure 1:
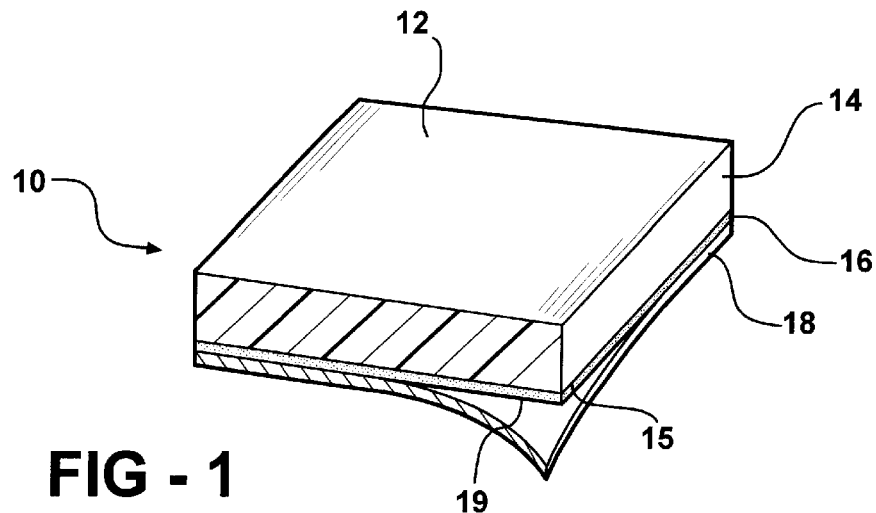
FIG. 1 is a perspective view of an adhesive applié containing phosphorescent particulate.

In an alternative embodiment shown in FIG. 1, an inventive applique is shown generally at 10, having phosphorescent material 12 embedded in or onto a polymeric sheet 14 amenable to adhesive securement to a surface of a lure. A phosphorescent polymeric sheet 14 typically contains one to twenty total weight percent of the polymeric sheet as phosphorescent particulate 12. The surface of the polymer sheet intended to contact a surface of the lure 15 is coated with a layer of conventional pressure sensitive adhesive 16. For storage purposes, the pressure sensitive adhesive is contacted with a removable backing layer 18. The backing layer 18 upon being peeled from the adhesive layer 16 exposes an active adhesive surface 19 for contact with a surface of a lure. The polymeric layer 14 is constructed of any material compatible with the phosphorescent particulate and the aqueous environment experienced by a lure in use. Materials from which polymeric layer 14 is constructed illustratively include polyethylene, polyvinyl chloride, and polyacrylate. While the thickness of an inventive polymeric layer is appreciated to vary with factors such as polymeric stiffness, phosphorescent particle loading and lure environment, the thickness is generally between 5 and 50 mils. It is appreciated that the applié 10 is readily cut into any number of shapes for application to a lure surface.

Regardless of the application method, once a phosphorescent material is attached to the surface of a lure, a UV LED flashlight affords a highly efficient charge of the phosphor resulting in efficient phosphorescent emission. A UV LED flashlight operative in the present invention emits either UV-A corresponding to between 315 nm and 405 nm or UV-B corresponding to between 280 nm and 320 nm. Operative UV LEDs herein include gallium indium nitride and gallium nitride. The UV LED flashlight preferably fits readily within the palm of one's hand. More preferably, the flashlight has a hook attachment such as that detailed in U.S. Pat. No. 6,299,323. Most preferably, a float is attached to the flashlight such that upon dropping the flashlight in the course of handling, the flashlight may be identified and retrieved by way of the attached float.

In an alternate embodiment, a battery powered mercury vapor arc or other ultraviolet light emitting gaseous tube is utilized to charge an inventive phosphor film or applié. These other gaseous tube UV emitters illustratively include metal halogens of iron-cobalt, gallium-indium and iron-gallium. It is appreciated that the size and efficiency of a UV LED relative to a tube ultraviolet emitter makes a UV LED a preferred phosphorescent charging source.

A commercial package according to the present invention includes a phosphorescent paint or applié amenable to application to a lure surface. The package also includes a UV LED flashlight and instructions for the use thereof to charge a lure having a phosphorescent film or applié thereon.

Figure 2:
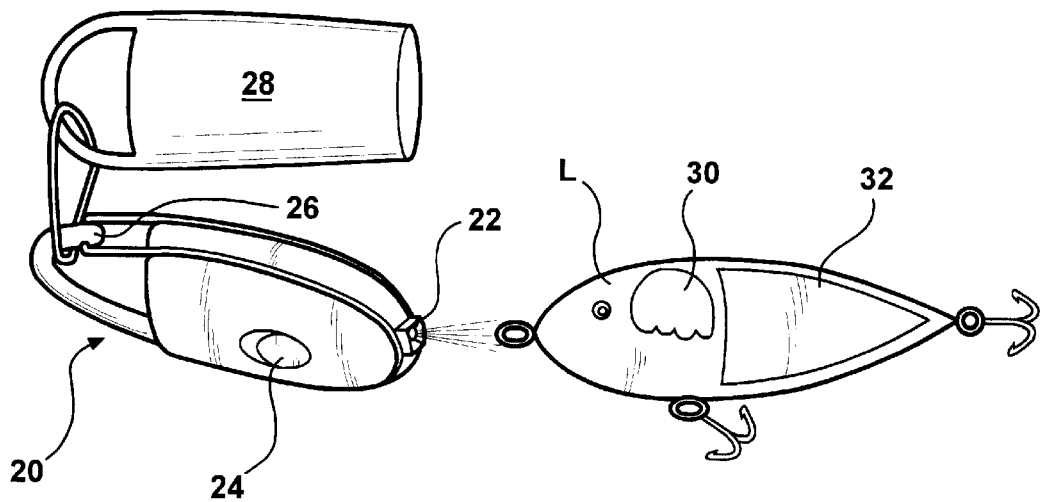
FIG. 2 is a schematic illustrating charging of a phosphorescent lure according to the present invention.

Referring now to FIG. 2, a UV LED flashlight is shown generally at 20. The flashlight 20 has an LED 22 that emits in either the UV-A or UV-B wavelength range. A switch 24 selectively illuminates the LED 22. A battery (not shown) within the flashlight 20 selectively forms a circuit with contacts of the switch 24 and leads of the LED 22 upon switch engagement. The flashlight 20 in a preferred embodiment has a hook 26 to which a float 28 is attached. The float 28 having sufficient buoyancy to retain the flashlight 20 proximate to the water surface in the event that the flashlight 20 falls into water. The emission from the LED 22 is directed onto a lure L having an inventive phosphorescent film 30 and/or a phosphorescent inventive applié 32 thereon. The now stimulated phosphorescent film 30 and/or phosphorescent applié 32 emits for a period of time consistent with the phosphorescent particulate decay time during which time the lure is presented to prey fish in an aquatic environment.

In an alternate embodiment, a lure having pre-applied regions of phosphorescent film or phosphorescent applié is packaged with a UV LED flashlight, battery powered mercury vapor arc lamp or other UV emitting gaseous tube light source.

Patents and patent applications mentioned in the specification are indicative of the levels of those skilled in the art to which the invention pertains. These patents and applications are incorporated herein by reference to the same extent as if each individual patent or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

What is claimed is:

1. A commercial package for making a fishing lure phosphoresce comprising in combination:
   a lure having a surface, the surface having phosphorescent particulate thereon;
   an ultraviolet light emitting battery powered light emitting diode flashlight having a continuous illumination upon switch engagement; and
   instructions for the use thereof to make a lure phosphoresce.

2. A commercial package for making a fishing lure phosphoresce comprising in combination:
   phosphorescent particulate in a form selected from the group consisting of a curable paint and an adhesive appliqué;
   an ultraviolet light emitting battery powered light emitting diode flashlight having a continuous illumination upon switch engagement; and
   instructions for the use thereof to make a lure phosphoresce.

3. The package of claim 2 wherein said flashlight further comprises a securement hook.

4. The package of claim 3 wherein said flashlight further comprises a float coupled thereto.

5. The package of claim 2 wherein said ultraviolet light emitting diode flashlight comprises a gallium nitride light emitting diode.

6. The package of claim 2 wherein said ultraviolet light emitting diode flashlight comprises a gallium indium nitride light emitting diode.

7. The package of claim 2 wherein said light emitting diode flashlight emits in a range of from 280 to 320 nanometers.

8. The package of claim 2 wherein said light emitting diode flashlight emits in a range of from 315 to 400 nanometers.

9. A process for activating a fishing lure which comprises the step of: exposing a fishing lure having a phosphor thereon to a continuous emission from an ultraviolet light emitting battery powered light emitting diode flashlight.

10. The process of claim 9 wherein said flashlight further comprises a securement hook.

11. The process of claim 10 wherein said flashlight further comprises a float coupled thereto.

12. The process of claim 9 wherein the emission is from 280 to 320 nanometers.

13. The process of claim 9 wherein the emission is from 315 to 400 nanometers.

14. The process of claim 9 further comprising the step of: attaching a float to said flashlight.

15. The process of claim 9 wherein said flashlight fits within a palm of a hand.

16. A process for preparing a phosphorescent fishing lure comprising the steps of:
   applying to a fishing lure phosphorescent particulate in a form selected from the group consisting of a curable paint and an adhesive appliqué; and
   exposing said phosphorescent particulate to continuous illumination from an ultraviolet light emitting diode flashlight.

17. The process of claim 16 wherein the illumination from said ultraviolet light emitting diode flashlight is in the range of from 280 to 320 nanometers.

18. The process of claim 16 wherein the illumination from said ultraviolet light emitting diode flashlight is in the range of from 315 to 400 nanometers.

19. At The process of claim 16 wherein said ultraviolet light emitting diode flashlight comprises a gallium nitride light emitting diode.

20.The process of claim 16 wherein said ultraviolet light emitting diode flashlight comprises a gallium indium nitride light emitting diode.

21. The process of claim 16 wherein said curable paint is ultraviolet light curable.

22. The process of claim 16 further comprising the step of attaching a float to said flashlight.

23. The process of claim 16 wherein said flashlight fits within a palm of a hand.

\* \* \* \* \*

UNITED STATES PATENT AND TRADEMARK OFFICE
CERTIFICATE OF CORRECTION

PATENT NO. : 6,684,557 B1
DATED : February 3, 2004
INVENTOR(S) : Sun Yu

It is certified that error appears in the above-identified patent and that said Letters Patent is hereby corrected as shown below:

Title page,
Item [57], ABSTRACT,
Line 3, delete "applié" and insert -- appliqué --.

Column 1,
Lines 56 and 66, delete "applié" and insert -- appliqué --.

Column 2,
Lines 9, 11, 28 and 56, delete "applié" and insert -- appliqué --.

Column 3,
Lines 10, 28, 35, 39, 51 and 58, delete "applié" and insert -- appliqué --.

Signed and Sealed this

Twenty-seventh Day of July, 2004

JON W. DUDAS
*Acting Director of the United States Patent and Trademark Office*